United States Patent [19] [11] Patent Number: 4,695,238
Taniguchi [45] Date of Patent: Sep. 22, 1987

[54] INJECTION MOLDER
[75] Inventor: Yoshiya Taniguchi, Hyogo, Japan
[73] Assignee: Toyo Machinary & Metal Co., Ltd., Hyogo, Japan
[21] Appl. No.: 786,039
[22] Filed: Oct. 10, 1985
[30] Foreign Application Priority Data
Jan. 21, 1985 [JP] Japan .................................. 60-6443
Mar. 25, 1985 [JP] Japan .......................... 60-59800[U]
[51] Int. Cl.$^4$ ........................................... B29C 45/02
[52] U.S. Cl. .............................. 425/145; 264/328.19; 425/146; 425/557; 425/561; 425/593
[58] Field of Search ............... 425/542, 544, 557, 559, 425/561, 593, 135, 149, 170, 562, 563, 145, 146, 586; 264/328.14, 328.15, 328.19
[56] References Cited
U.S. PATENT DOCUMENTS 3,813,014  5/1974  Guerin ................................. 425/563
3,954,209  5/1976  Ramond ............................... 425/563
4,076,485  2/1978  Sokolow .............................. 425/562
4,325,896  4/1982  Rodgers, Jr. ........................ 425/149
4,540,139  9/1985  Yamazaki ............................ 425/135

Primary Examiner—Jay H. Woo
Assistant Examiner—Timothy W. Heitbrink
Attorney, Agent, or Firm—Armstrong, Nikaido, Marmelstein & Kubovcik

[57] ABSTRACT

The invention relates to injection molding and is provided with a heating cylinder, an injection nozzle disposed at the forward end of the heating cylinder, a resin feed means, such as screw, which feeds molten resin to a portion in the vicinity of the forward end of the heating cylinder. Also provided is a piston means, such as a plunger, which has a stop valve mechanism that closes when it is moved in an injection direction and is opened when it is moved in a counterinjection direction and injects molten resin, fed to a portion in the vicinity of the forward end of the heating cylinder, into a cavity through the injection nozzle, whereby, through driving of the resin feed means and the piston means, charging of molten resin into the forward end of the heating cylinder and injection of the molten resin into a cavity are carried out partially concurrently.

10 Claims, 22 Drawing Figures

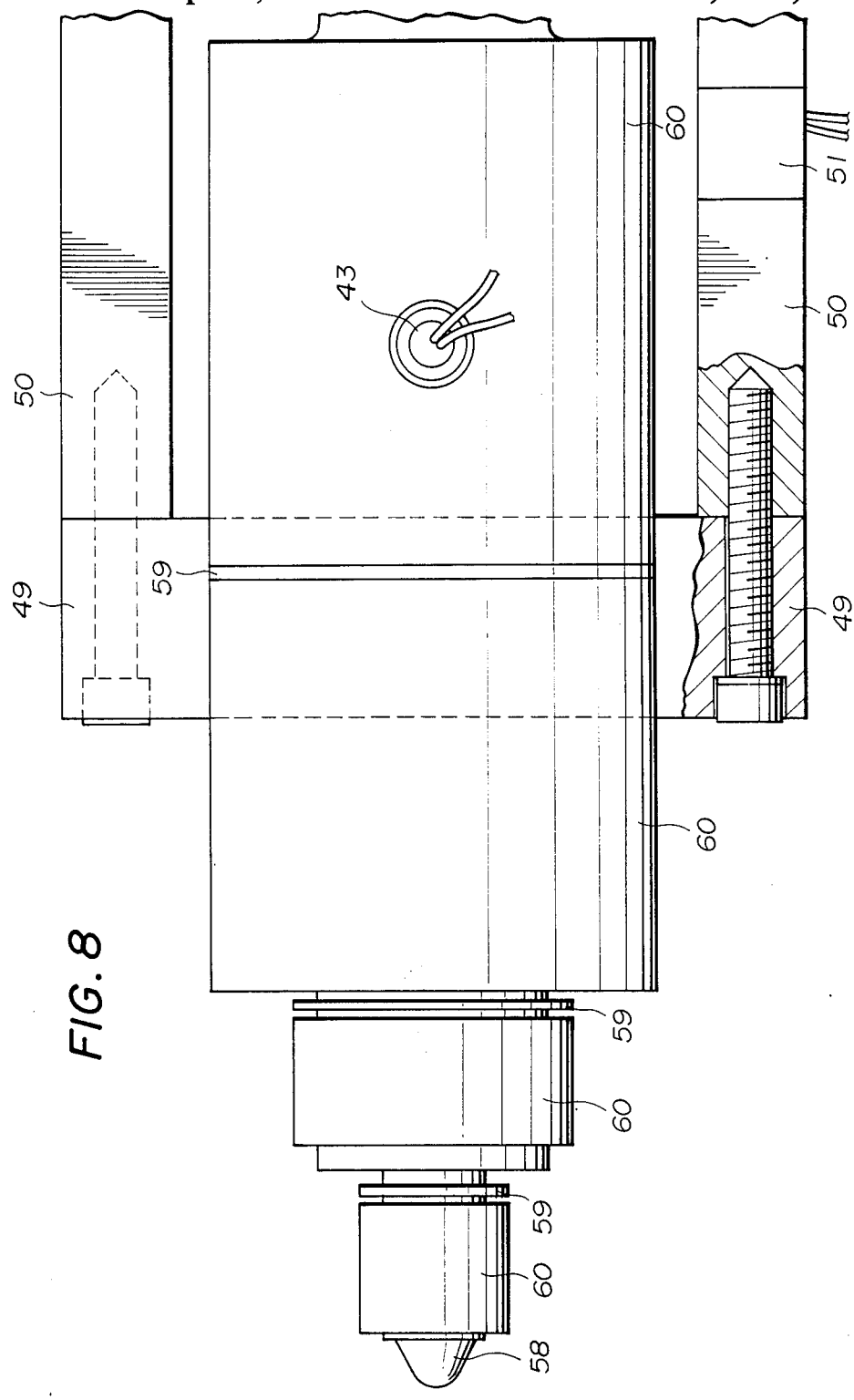

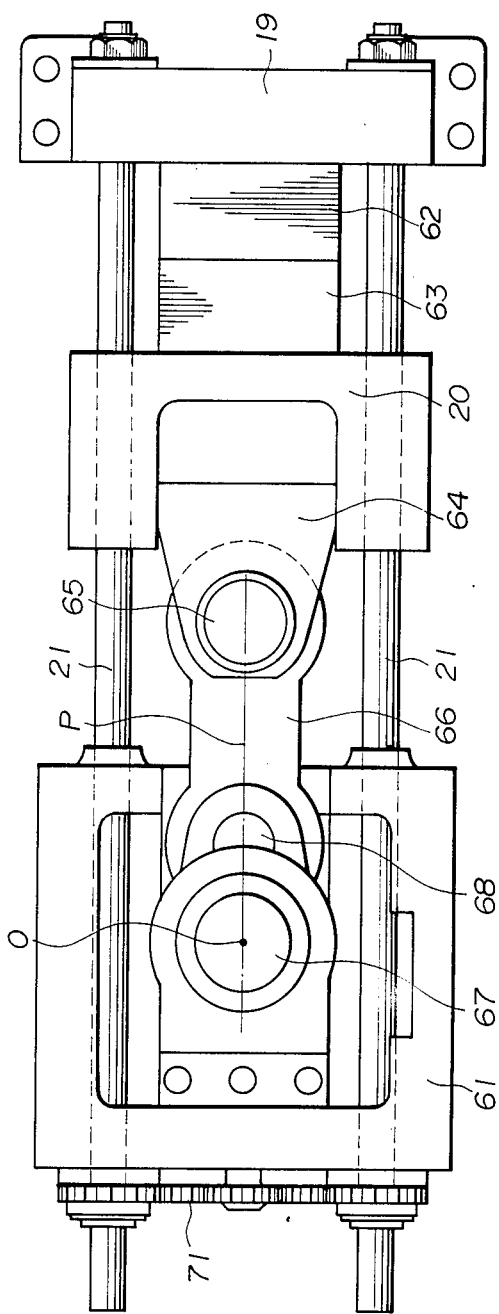

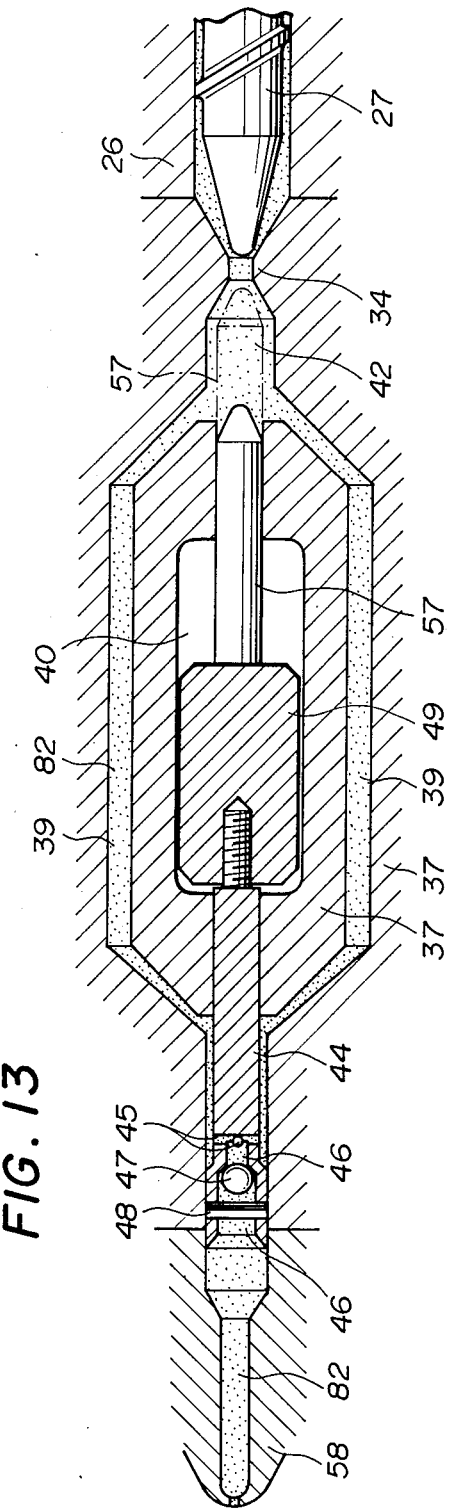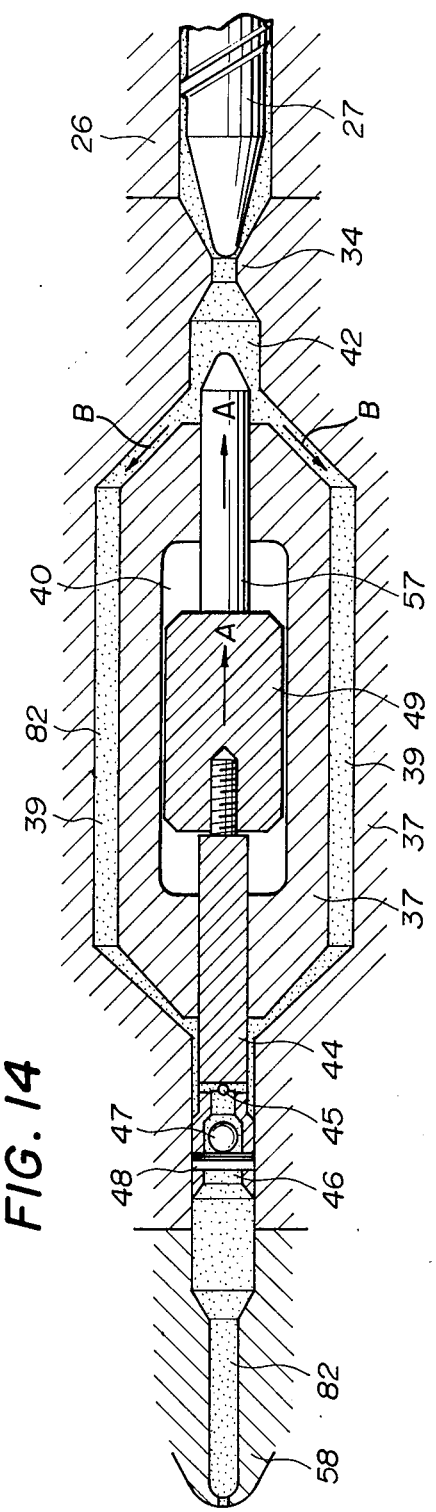

INJECTION MOLDER

BACKGROUND OF THE INVENTION
1. Field of the Invention:

This invention is related to an injection molder and particularly to an injection molder which enables to perform high speed molding and precise molding.
2. Description of the Prior Art:

In a conventional injection molder, a screw for injection is rotatably and forward and backward movably arranged within a heating cylinder. The rotation of the screw causes synthetic resin in a molten condition to be fed in an accumulating chamber located at the forward end of a heating cylinder, and thereafter, the synthetic resin is injected in a cavity to fill the cavity therewith through forward movement of the screw.

In a conventional injection molding method as described above, after the molten synthetic resin has been charged, injection takes place, and thereby it has a disadvantage in which it takes time and is a barrier to high-speed molding.

FIG. 22 is an explanatory drawing indicating an actual cycle of a whole injection molding process. In a diagram, A illustrates a mold opening process, B the ejecting process of an eject member, C the return process of the eject member, D a mold closing process, E an injection process, and F a charge process. As shown in this diagram, in a conventional injection molding method, each process is carried out serially in terms of time, and thereby the actual cycle time is increased and this also causes impediment of improvement of the operating speed of a molder.

Recently, for the reason that feedback control of a position is effected easily, response is excellent, and motion is stable even at a high speed, utilization of a servo motor as a driving source for an injection molder is studied in every way. A control method, as published in, for example, the patent gazette publication No. 58-179631, is proposed as a control method for the back pressure of a screw in a servo motor-driven injection molder.

In the back pressure control method, the back pressure of the screw is controlled in a way that forward movement of the screw, occurring when molten synthetic resin is charged through rotation of the screw, is converted into rotary movement by means of a gear means, the rotation force is adjusted by a brake means, and this causes control of the back pressure of the screw.

This method, however, has a disadvantage in which, in order to convert backward movement of the screw into rotary movement, a gear means is employed, or a brake means is used to control rotary movement produced resulting from conversion, and thereby making stable and accurate control of the back pressure difficult. Meanwhile, conventionally, a toggle type mold clamping device and a direct pressure type mold clamping device are employed as the clamping device of an injection molder. Such devices are both driven hydraulically, and a clamping operation is effected so that the flow direction of pressure oil therein is switched to a forward or a reverse direction at a given time. Thereby, a valve is required for switching motion, a lag occurs until an oil pressure is increased to a given pressure after the flow of pressure oil is switched, and this causes impediment of high-speed molding.

SUMMARY OF THE INVENTION

An object of this invention is to provide an injection molder which eliminates a technical disadvantage and is capable of performing high speed molding and precise molding.

BRIEF DESCRIPTION OF THE DRAWINGS

FIG. 1 to FIG. 9 illustrates an injection molder containing embodiments of this invention.

FIG. 1 is an outlined arrangement view, seen from the front of the main parts of an injection molder, FIG. 2 is a front view of a control-display panel part,

FIG. 3 and

FIG. 4 are a top view and a front view illustrating the outlined constitution of the injection molder, FIG. 5 is a section view of a portion in the vicinity of a screw for injection, FIG. 6 is a section view of a portion in the vicinity of an accumulator chamber, FIG. 7 is a section view taken on line I—I, FIG. 8 is a top view of a portion in the vicinity of an accumulator chamber, FIG. 9 is a section view of a portion in the vicinity of the forward end of a plunger, FIG. 10 and FIG. 11 are a top view and a front view of a mold clamping part, FIG. 13 is a section view of main parts at a point of time when a dwell process is completed, FIG. 14 is a section view of main parts illustrating a motion after a dwell process is completed.

15: servo motor for charging, 16; servo motor for injection, 19: stationary die plate, 20: moving dis plate, 24: servo motor for opening and closing a mold, 26: heating cylinder, 27; screw, 34: orifice, 37: cylinder member, 38: injection hole, 39: passage, 43: charge pressure sensor, 44: plunger, 45: radial hole, 46: axial hole, 47: ball, 49: hold arm, 50: injection bar, 51: injection reaction sensor, 52: driving body, 53: screw cylinder body, 58: nozzle, 66: crank arm, 67: crank shaft, 68: eccentric shaft part, 82: molten resin, 86: charge pressure setter, 87: dwell setter, 88: controller part body.

DESCRIPTION OF THE PREFERRED EMBODIMENTS

Figure 1:
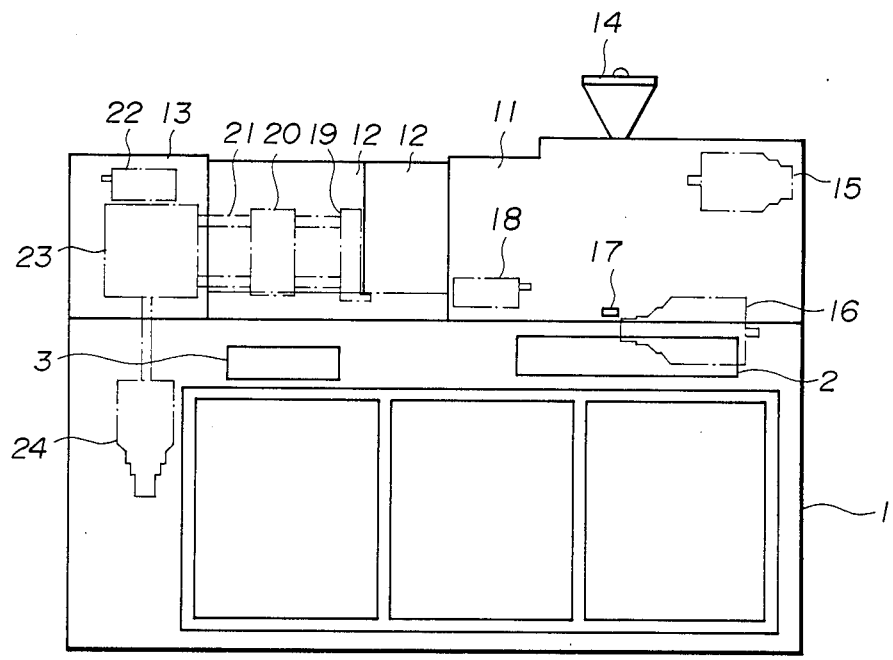

Exemplary embodiments of the present invention are hereinafter described together with the drawings. FIG. 1 is an outlined arrangement diagram, as seen from the front, of the main parts of an injection molder.

Referring to outlined constitution of an injection mold of FIG. 1 wherein 1 is the base part of an injection molder, and a control-display panel part 2 is located on the right and a chute 3 for discharging a molded product is situated in the front at the upper part on the left as one faces the drawing.

Figure 2:
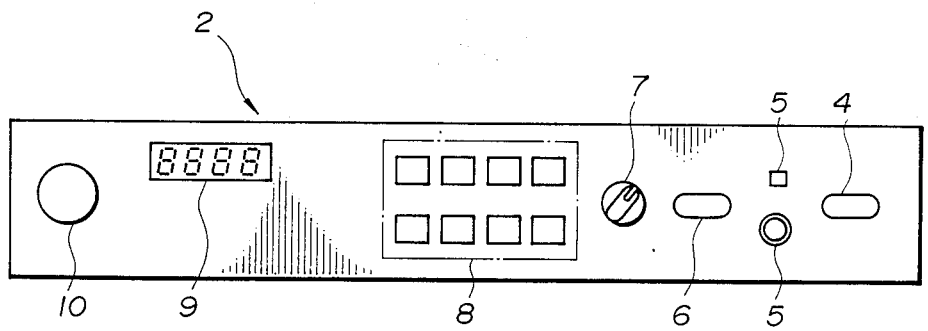

FIG. 2 is a front view of the control-display panel part 2, and numeral 4 in the die is a teaching power switch. 5 is a connection part of a teaching box which is described later, 6 is a numeral control power source, 7 is a heater switch, 8 is a control key group, consisting of control keys, such as manual operation, semi-automatic operation, automatic operation, switching ON of a motor, forward movement of a nozzle, backward movement of a nozzle, mold opening and closing, injection molding, etc. 9 is a code display part consisting of seven segment of 4 digits, and 10 is an emergency stop button.

Referring to the outlined constitution of an injection mold of FIG. 1, wherein the upper part of said base part 1 is provided with an injection cover 11, a safety door 12, and a crank cover 13.

A hopper 14, through which pellet-form molding material is charged, is situated on the injection cover 11, and a heating cylinder, containing a screw, which is described later, in addition to a servo motor 15 for charging, a servo motor 16 for injection, a nozzle touch limit switch 17, a motor 18 for a nozzle touch back, is disposed at the interior of the cover.

In the safety door 12, a stationary die plate 19, a moving die plate 20, and a tie bar 21 are located. A motor 22 for adjusting mold thickness, and tail stock 23 are situated in the crank cover 13, and a servo motor 24 for opening and closing a mold is positioned therebelow.

The arrangement condition of the main parts of an injection molder is illustrated in FIG. 1, but the injection mechanism and the mold clamping mechanism of the injection molder are described as follows.

Figure 3:
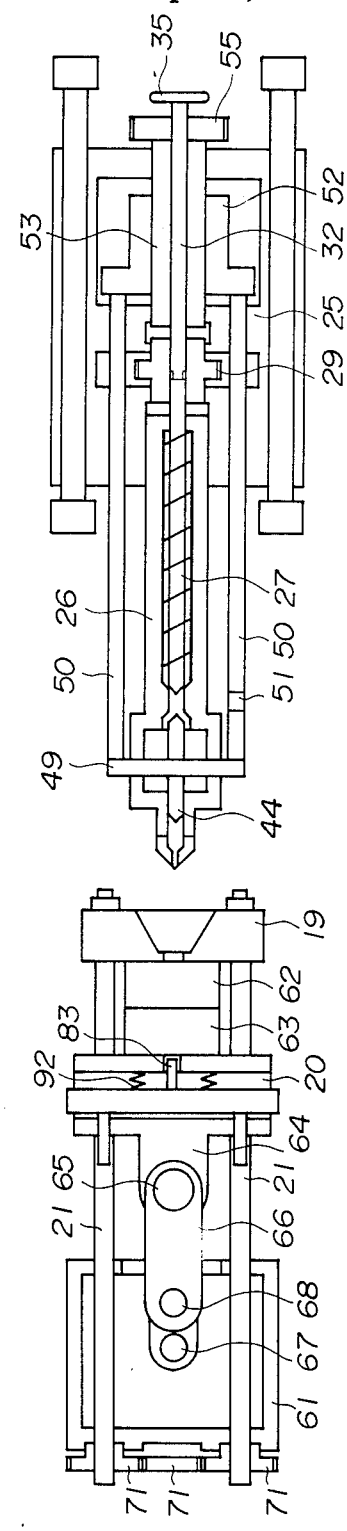
Figure 9:
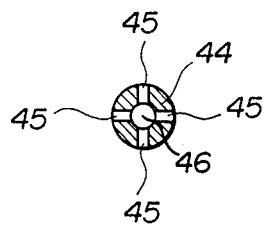

Referring to FIG. 3 and FIG. 9 wherein the structure of the injection mechanism is described in details.

Figure 4:
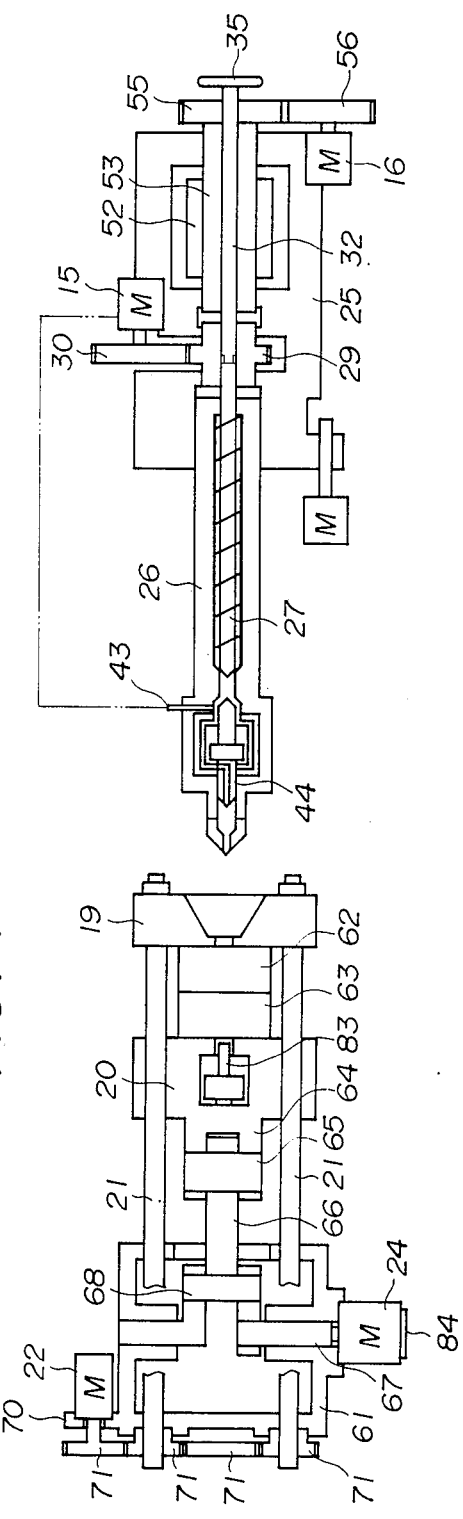
Figure 5:
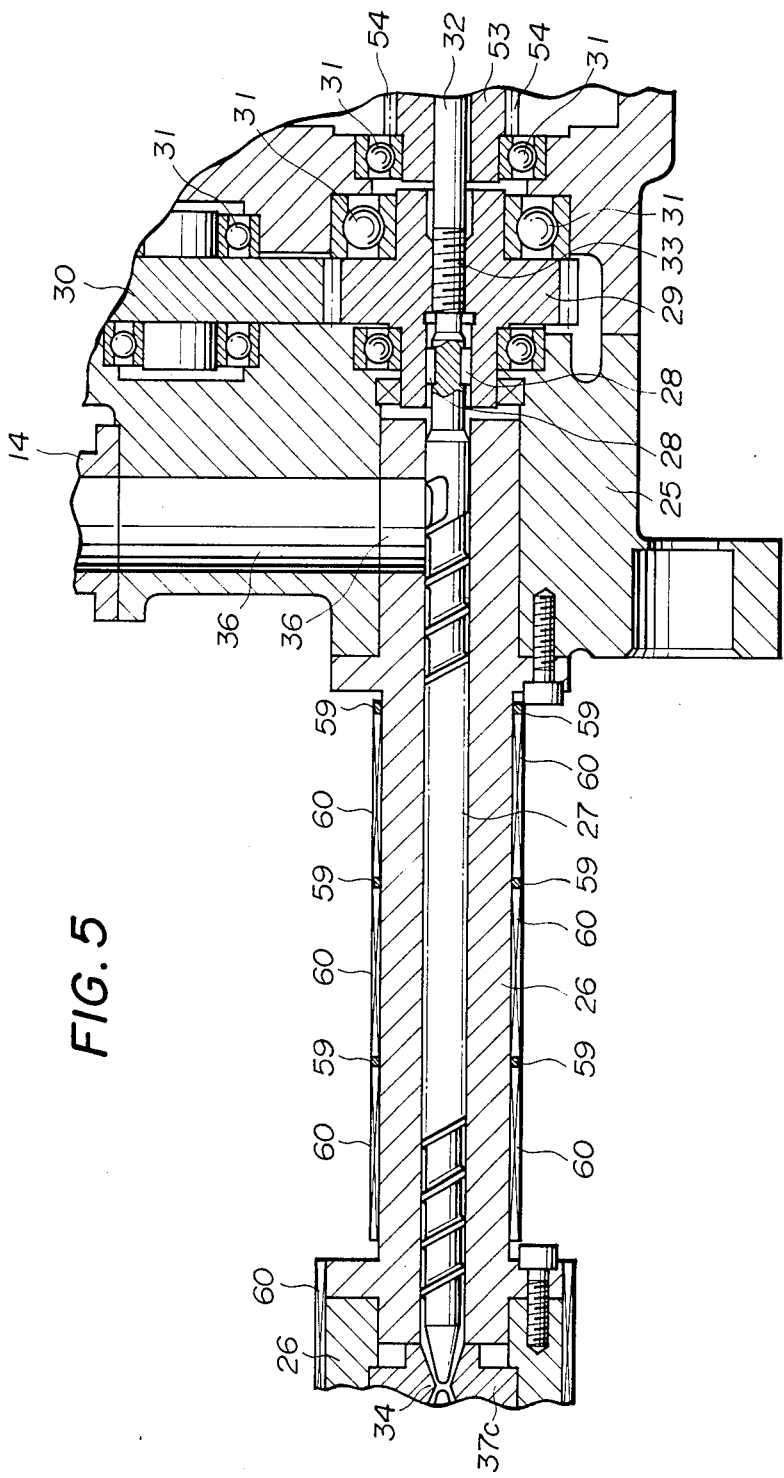
Figure 6:
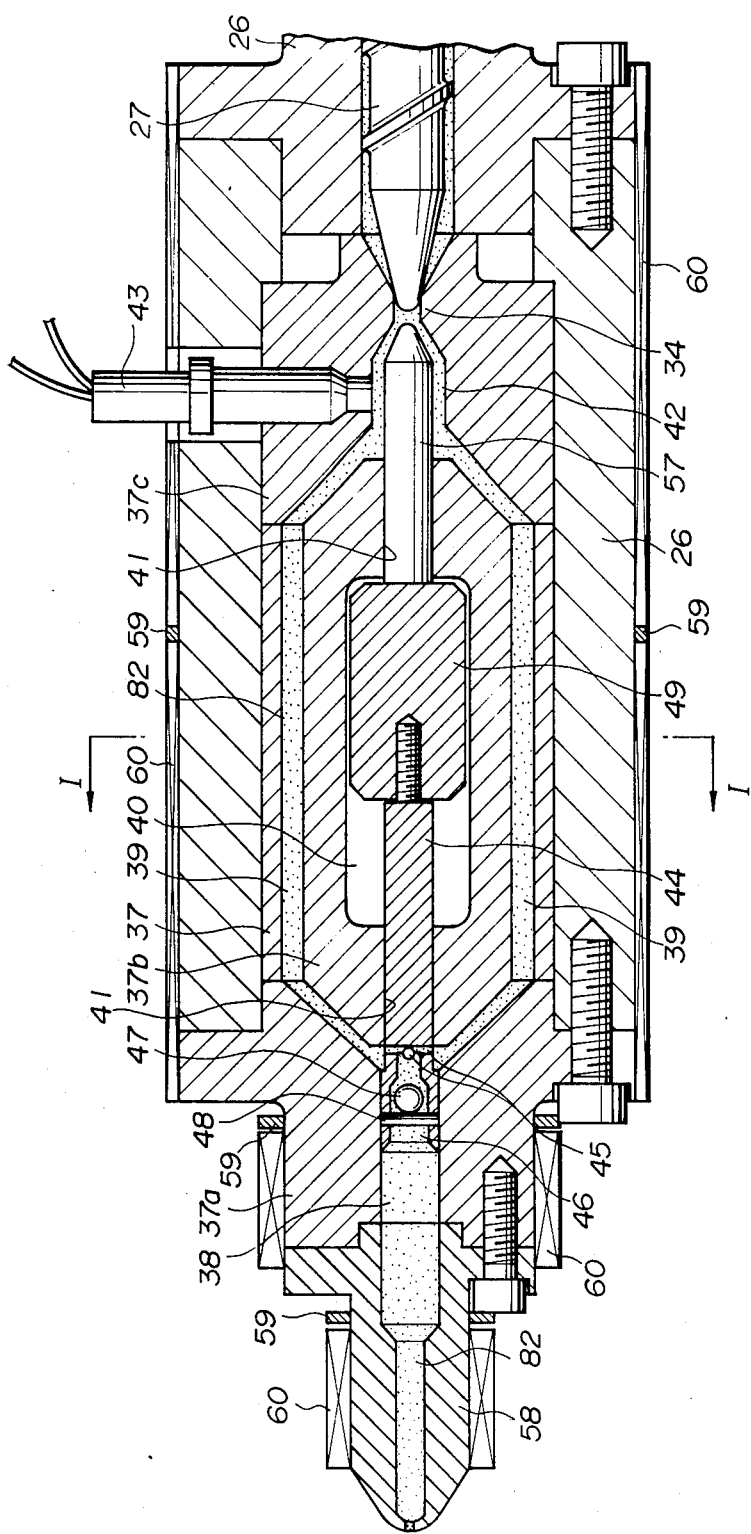
Figure 7:
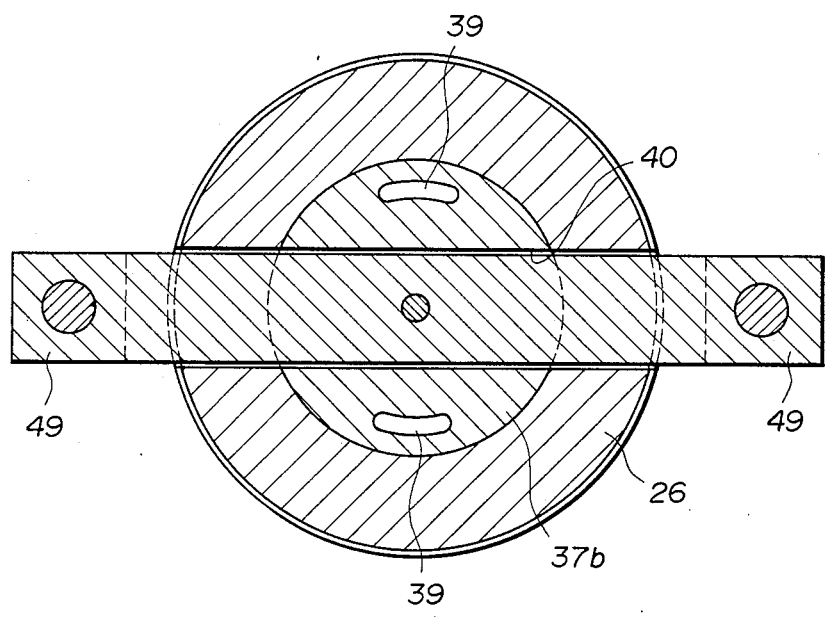

FIG. 3 and FIG. 4 are a top view and a front view illustrating outlined constitution of the injection molder, FIG. 5 is a section view of a portion in the vicinity of a screw for injection, FIG. 6 is a section view of a portion in the vicinity of an acumulator chamber, FIG. 7 is a section view taken on line I—I, FIG. 8 is a top view of a portion in the vicinity of an accumulator chamber, and FIG. 9 is a section view of a portion in the vicinity of the forward end of a plunger.

A heating cylinder 26 is located at the front of an injection part body 25, and a screw 27 is rotatably inserted in the heating cylinder 26. The rear end of the screw 27 is engaged with a gear 29 by means of a plurality of keys 28 peripherally disposed as shown in FIG. 5. Thus, the screw 27 is rotated integrally with the gear 29, and is axially positioned slightly slidably over the gear 29. The gear 29 is engaged with a gear 30 on the driving side of a servo motor 15 for charging, as shown in FIG. 4, and the gears 29 and 30 are both supported in the injection part body 25 through a ball bearing 31. Thus, the rotational driving force of the servo motor 15 for changing is transferred to the screw 27 through the gears 30 and 29 and the key 28, and therefore the screw 27 is rotationally driven in a specified direction.

The forward end of a screw rod 32 makes contact with the rear end surface of the screw 27, and a screw part 33 of the screw rod 32 is threadedly engaged, as shown in FIG. 5, with a tapped hole in the gear 29. A handle 35 is mounted, as shown in FIG. 3 and FIG. 4, to the rear end of the screw rod 32 so that the back pressure of the screw 27 is adjustable, i.e., a gap between the forward end part of the screw 27 and an orifice 34 is adjustable.

Pellet charging holes 36 are formed, as shown in FIG. 5, in a position in the injection part body 25 and the heating cylinder 26, and a hopper 14 is communicated with the hollow part of the heating cylinder 26 through the pellet charging hole 36.

A cylinder member 37 is secured, as shown in FIG. 6, to the inner side of the forward end of the heating cylinder 26. The cylinder member 37 consists of a front end part 37a, a middle part 37b, and a rear end part 37c. An injection hole 38 is axially provided in the center of the front end part 37a, and the rear end of the front end part 37a is conically spread toward the middle part 37b side. A plurality of passages 39 are axially formed in the vicinity of the outer peripheral part of the middle part 37b, and a slide chamber 40, running in a direction extending orthogonally to an axial direction, is formed in the central part of the middle part 37b. Slide holes 41 are provided, extending toward the front and the rear from the central part of the slide chamber 40. An introducing hole 42 is axially formed in the center of the rear end part 37c, the front thereof is conically spread toward the middle part 37b side, and meanwhile, the rear part of the rear end part 37c is throttled to a given size to form the orifice 34.

An accumulator chamber is formed with a gap between the front end part 37a of the cylinder member 37 and the middle part 37b, the passage 39 in the middle part 37b, a gap between the middle part 37b and the rear end part 37c, and the introduction hole 42 in the rear end part 37c.

The charge pressure sensor 43 consisting of a load cell is attached to the rear end part 37c, the sensing part thereof faces on the introducing hole 42, and a signal from the charge pressure sensor 43 is input, as shown in FIG. 4, to the servo motor 15 for charging through a control part hereinafter described.

A plunger 44, having approxiamately the same size as those of the slide hole and an injection hole, is slidably interposed into a portion ranging from the front slide hole 41 in the middle part 37b to an injection hole 38 in the front end part 37a, and a portion in the vicinity of the forward end of the plunger has one or plural radial holes 45 (see FIG. 9) extending from an outer periphery to the center thereof and an axial hole 46 which is communicated with the radial holes 45 and is open toward the forward end of the plunger 44. As shown in FIG. 6, a portion beyond the middle part of the axial hole 46 is increased in size, and a ball 47 and a pull-off protecting pin 48 are interposed into the large size part.

The rear end of the plunger 44 is secured to a holder arm 49 by means of screws, the opposite ends of the holder arm 49 are emerged, as shown in FIG. 8, from the heating cylinder 26 to the outside, the opposite ends are respectively coupled to injection bars 50, and an injection reaction force sensor 51 is located halfway along the one injection bar 50.

The rear ends of the injection bars 50 are respectively coupled, as shown in FIG. 3, to the forward end of a driving body 52, a tapped hole is formed in the center of the driving body 52, and a screw cylinder body 53 is threadedly inserted into the tapped hole. The screw cylinder 53 is rotatably supported, as shown in FIG. 5, by means of the ball bearings 31, and a screw part 54, threadedly joined with the driving body 52, is formed in the outer periphery. The screw rod 32 extends through the central part of the cylinder 53, and the screw rod 32 and the screw cylinder 53 are adapted to be rotatable separately from each other. A gear 55 is attached, as shown in Fig. 4, to the rear end of the screw cylinder 53, and the gear 55 is geared with a gear 56 on the driving side of the servo motor 16 for injection. Thus, the rotational driving force of the servo motor 16 for injection is transferred to the plunger 44 through the gear 56 on the driving side, the gear 55, the screw cylinder 53, the driving body 52, the injection bar 50, and the holder arm 49, and the plunger 44 is moved forward and backward through forward and reverse running of said servo motor 16 for injection.

A needle 57, extending toward the orifice 34 side, is disposed, as shown in FIG. 6, to the rear of the holder arm 49, and is located individually from the holder arm 49. A nozzle 58 is mounted to the forward end of the cylinder member 37, and plural thermostats 59 and heaters 60, making respective pairs, are wound in positions around the outer periphery of the nozzle 58, the forward end of the cylinder member 37, and the outer periphery of the heating cylinder 26.

Figure 11:
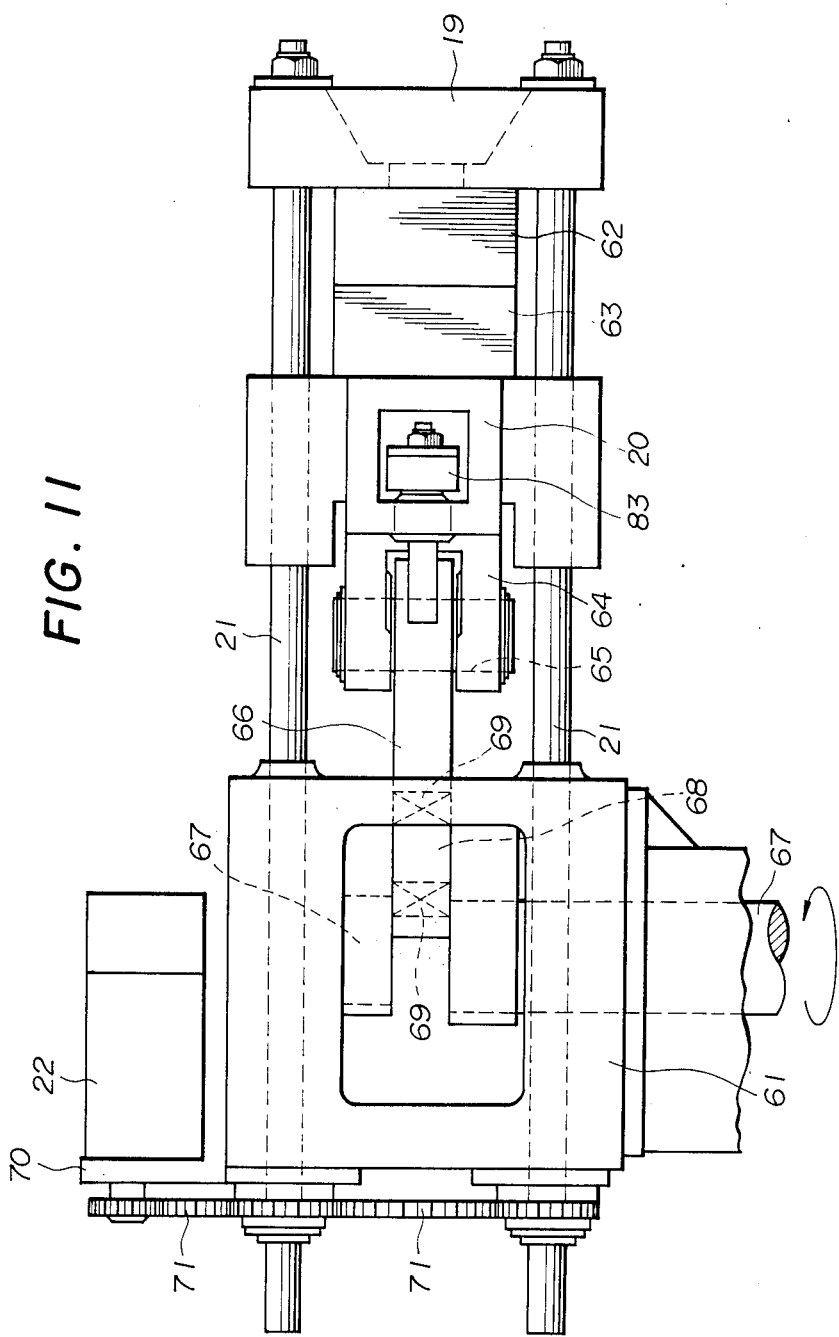

Structure of a mold clamping mechanism is now described. FIG. 10 and FIG. 11 are a top view and front view of a mold clamping part.

Four tie bars 21, disposed at given intervals, are located between a housing 61 and the stationary die plate 19. A moving die plate 20 is disposed movably to and from the stationary die plate 19 by means of the tie bars 21 serving to guide the moving plate. A mold 62 on the stationary side and a mold 63 on the moving side are secured to the stationary die plate 19 and the moving die plate 20, respectively, and the mold 63 on the moving side is located so that it can be brought into contact with and separated from the mold 62 on the stationary side.

A bracket 64, protruded from the moving die plate 20, is attached thereto, and the free end of a crank arm 66 is coupled to the bracket 64 through a pin 65.

As shown in FIG. 4, the servo motor 24 for opening and closing a mold is mounted below the housing 61, and the base end part of the crank arm 66 is rotatably coupled to an eccentric shaft part 68 of a crank shaft 67 coupled to the driving shaft of the servo motor for opening and closing a mold through a bearing 69 (see FIG. 11). Thus, the driving force of the servo motor 24 for opening and closing a mold is transferred to the moving plate 20 through the crank shaft 67, the eccentric part 68, the crank arm 66, and the bracket 64, the rotational movement of the servo motor 24 is converted into forward and backward movement through a crank mechanism, and the mold 63 on the moving side is brought into contact with and separate from the mold 62 on the stationary side.

As shown in FIG. 4 and FIG. 11, the motor 22 for adjusting mold thickness is attached above the housing 61 through a bracket 70, the driving thereof is coupled to the tie bars 21 through a gear group 71, and the rotation of the motor 22 enables adjustment of mold thickness.

Figure 12:
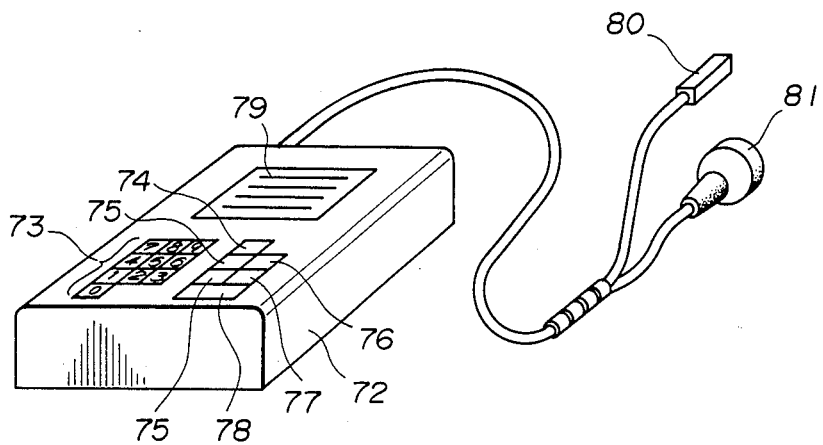
FIG. 12 is a perspective view.

FIG. 12 is a perspective view of a teaching box. An input key, such as ten-key 73, a menu key 74, a cursor key 75, an on-key 76, a reset key 77, and an entry key 78, and a display part 79 are positioned on the upper surface of a box body 72. An optical fiber cable 80 and a metal connector 81 are connected to the box body 72, and are plugged in a connection part 5 of the teaching box of a control-display panel 2 illustrated in FIG. 2. The use of the teaching box enables setting of various molding data even from a remote place away from a molder body.

The motion of the injection molder is described as follows. Under a condition as shown in FIG. 5 and FIG. 6, the screw 27 is rotated through driving of the servo motor 15 for charging, and resin pellets, being a molding material, are charged through the hopper 14 to feed the pellets to the heating cylinder 26. Supplied synthetic resin 82 gradually passes through the orifice 34 as it is plasticized and molten through rotation of the screw 27, and is fed to the accumulator chamber formed with a cylinder member 37.

Further, the radial holes 45, the axial hole 46, the injection hole 38, and the nozzle 58 are filled with molten resin 82. The pressure of the filled molten resin 82 causes the ball 47 to be pushed forward, but the ball is prevented from coming off with the aid of the pin 48.

Under a condition in which the space is filled with the molten resin 82 as shown in FIG. 6, the servo motor 16 for injection is driven forwardly. Through such driving of the motor, the gear 56 on the driving side, the gear 55, and the screw cylinder body 53, which are shown in FIG. 4, are rotated, and along with such rotation, the plunger 44 is moved forward toward the mold side through the driving body 52, the injection bar 50, and the holder arm 49.

Immediately after a resin pressure is applied on the ball 47 resulting from forward movement of the plunger, the ball is moved backward immediately, and the axial hole 46 is forced into a condition in which the small part thereof is closed with the ball 47 as shown in FIG. 13. Namely, a stop valve mechanism is formed with the ball 47 and the small part of the axial hole 46. With this, the plunger 44 is moved forward, and this causes the molten resin 82 to be injected into molds 62 and 63 through the nozzle 58.

An amount of the molten resin 82 injected is determined by the stroke distance of the plunger 44, and the stroke distance of the plunger 44 can be adjusted by changing the rotary amount of the servo motor 16 for injection. Determination of a final injection is effected after a finish molded product is observed, and it is essential that the stroke distance of the plunger 44 is set so as to prevent production of sink mark and burrs.

As described above, when the plunger 44 and the hold arm 49 are moved forward, the needle 57 is left in a position as it is as shown by one-dot chain line in FIG. 13, but the needle 57 is also pushed and is moved forward by the subsequent supply of the molten resin 82 with the aid of the screw 27, and is forced into contact with the holder arm 49. An injection process consists of a filling process, in which the cavity is filled with the molten resin, and a dwell process in which the resin in the cavity is pressed until the resin is cured within the cavity. During the dwell process, the molten resin 82 is fed in the accumulator chamber to fill the chamber with the resin. FIG. 13 is a section view of main parts at a point of time when the dwell process is completed.

After the dwell process is completed, reverse running of the servo motor 16 for injection causes the plunger 44, the holder arm 49, and the needle 57 to be all moved back to the original position as shown in FIG. 14. Such movement causes the resin to exert pressure on the ball 47. Ball 47 is immediately moved against the pin 48 of hole 46 due to the pressure from the resin. As a result, the small part of the axial hole 46 is opened, and a part of the molten resin 82 is fed in the injection hole 38 through the radial holes 45 and the axial hole 46 along with the movement of the plunger 44.

When, as shown in FIG. 14, the needle 57 is pushed by the holder arm 49 and moved backward as shown by arrow A, the movement of the needle 57 causes the molten resin 82, gathered in the introduction hole 42, to be pushed forward in the direction shown by arrow mark B. Since the screw 27 is always continuously rotated, the molten resin 82 is supplied to the accumulator chamber through the orifice 34.

As noted above, the injection molder according to the present invention is operated such that, even when the cavity is filled with the molten resin and dwell is carried out through reciprocation of the plunger 44 within the cylinder member 37, the screw 27 is continuously rotated in a feed direction, and thereby the accumulator chamber, the injection hole 38, and the nozzle 58 are forced into a condition in which they are always full of the molten resin 82.

Figure 15:
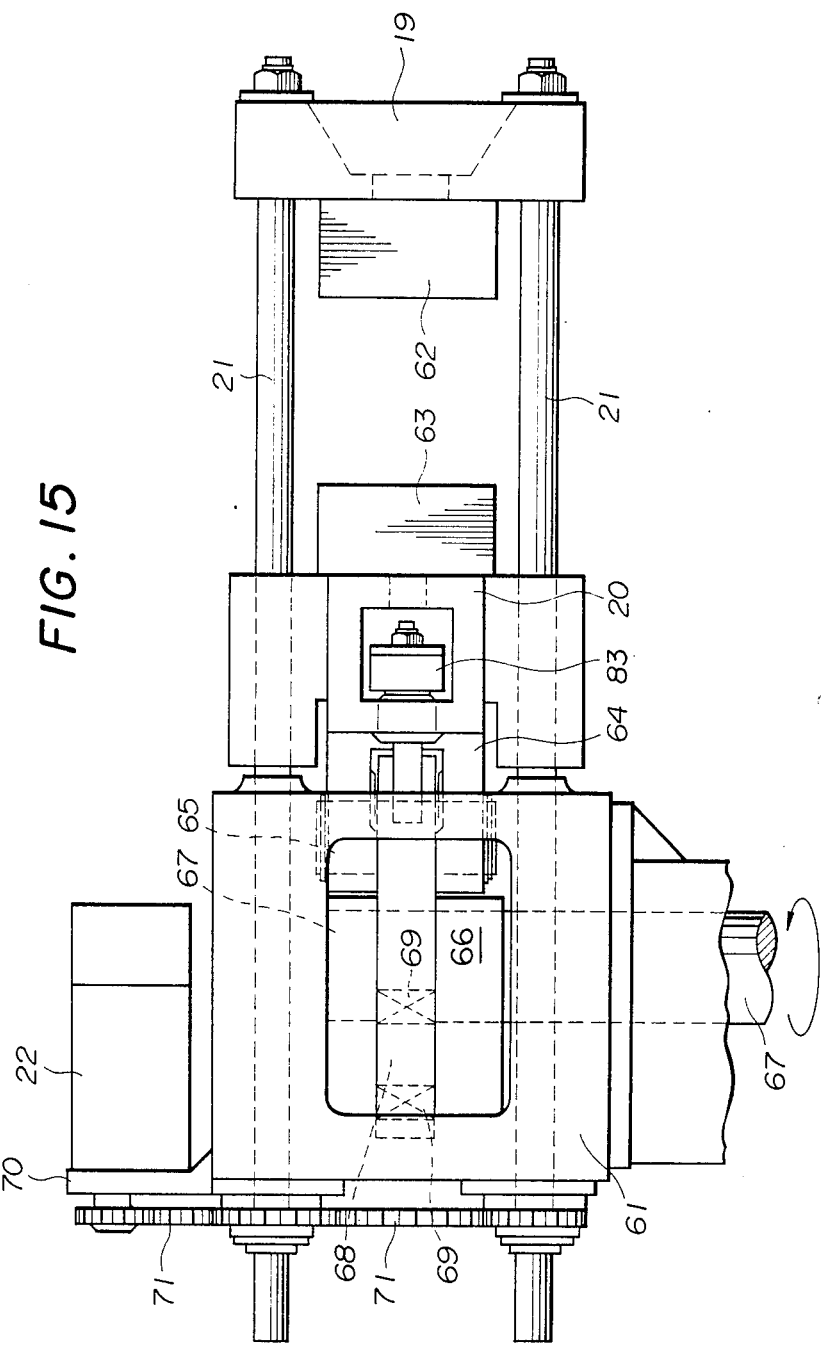
FIG. 15 is a front view illustrating the mold opening state of a mold clamping part.

Opening and closing motion of a mold is described as follows. FIG. 15 is a front view illustrating the mold-closing state of the mold clamping part. Under this condition, the moving die plate 20 is moved backward, and a distance between the mold 62 on the stationary side and the mold 63 on the moving side is maintained. By rotating the crank shaft 67 through driving of the servo motor 24 (see FIG. 4) in response to a mold clamping signal from a controller part, the eccentric shaft part 68 is rotated about the crank shaft 67. The moving plate 20 is moved straight as it is guided through the crank arm 66 with the aid of the tie bar 21 along with such rotation of the eccentric shaft, and the mold 63 on the moving side approaches the mold 62 on the stationary side. When the servo motor 24 for opening and closing a mold is turned in a 180° arc, a central axis line P of the crank arm 66 is aligned as shown in FIG. 10, with a rotary center 0 of the crank shaft 67, the crank arm 66 is brought into a condition in which it is stretched to its full size, and the mold 63 on the moving side is forced into press contact with the mold 62 on the stationary side to perform powerful clamping of the mold. With this, rotation of the servo motor 24 for opening and closing a mold is stopped, the movement of the moving die plate 20 is stopped, and the cavity is filled with the molten resin and dwell is conducted in a manner described above.

After an injection molding process is completed, by rotating the crank shaft 67 in one-way through redriving of the servo motor 24 for opening and closing a mold, the moving die plate 20 (the mold 63 on the moving side) is separated from the stationary die plate 19 (the mold 62 on the stationary side), and mold-opening takes place. In linkage with the opening motion of the mold, an eject rod 83, which has been hitherto moved backward, is moved forward, a molded product present within the mold 63 on the moving side is ejected through such forward movement, and is discharged to the outside of the injection molder through a chute 3 (see FIG. 1). After the molded product is removed in a manner described above, as the mold is clamped through rotation in the same direction of the crank shaft 67, the eject rod 83 is moved backward along with compression of a spring 92 (see FIG. 3).

Figure 16:
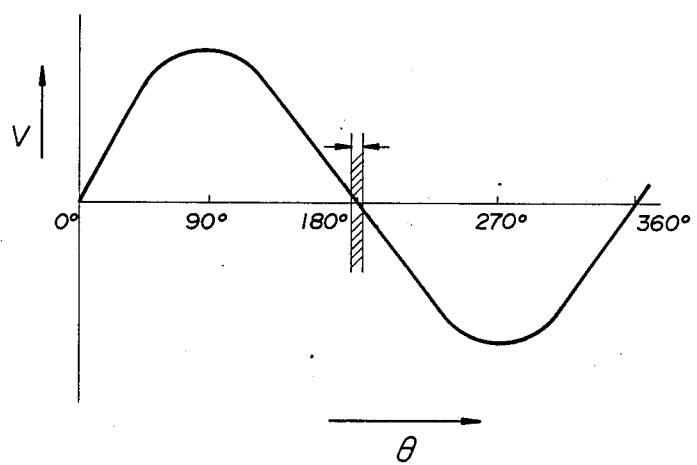
FIG. 16 is a properties diagram indicating a relation between a rotary angle and the moving speed of a moving die plate.

FIG. 16 is a properties diagram illustrating a relation between a rotary angle $\theta$ of the crank shaft 67 and a moving speed V of the moving die plate 20.

From a position in which the moving die plate 20 is positioned furthest away from the stationary die plate 19, i.e., a state (rotary angle $\theta$=0-degree) in which the eccentric part 68 of the crank shaft 67 is positioned right in the rear of the moving die plate as shown in FIG. 15, the servo motor 24 for opening and closing a mold is driven to rotate the crank shaft 67. As shown in said FIG. 15, at a time when the crank shaft is starting to rotate, a moving speed V is low, but when the rotary angle $\theta$ approaches about 90°, the speed is increased, and when it passes about 90°, the moving speed V is gradually decreased. When the rotary angle $\theta$ approaches about 180°, the mold 63 on the moving side makes contact with the mold 62 on the stationary side, and with an increase in the rotary angle $\theta$, a contact pressure is also increased. When an angle sensor 84 (see FIG. 4), such as encorders, additionally attached to the driving shaft of the servo motor 24 for opening and closing a mold, detects that the rotary angle is within a range (which is shown by hatching in FIG. 16 by enlargement) of ±0.1° at the rotary angle of 180°, a controller part decides that the rotary angle $\theta$ of the crank shaft 67 attains a dead point of 180°, and stops the rotation of the servo motor 24 for opening and closing the mold and stops the movement of the moving die plate 20. With this, the above-mentioned injection and dwell take place.

The injection and dwell are completed, the crank shaft 67 is further rotated in a 180° arc to open the mold, and the moving die plate 20 is returned to its original position to complete one cycle of mold opening and closing process.

In the injection molder according to the present invention, the moving die plate is reciprocated through one-way rotational driving by means of a crank system, and the moving die plate makes contact with and is separated from the stationary die plate. Thus, simple and smooth reciprocation of the moving die plate enables the injection molder to shorten a cycle of the whole injection molding process. Further, the servo motor is employed by the driving source of the mold opening and closing motion, and this permits improvement with which the crank is brought to a stop at the dead point.

Figure 17:
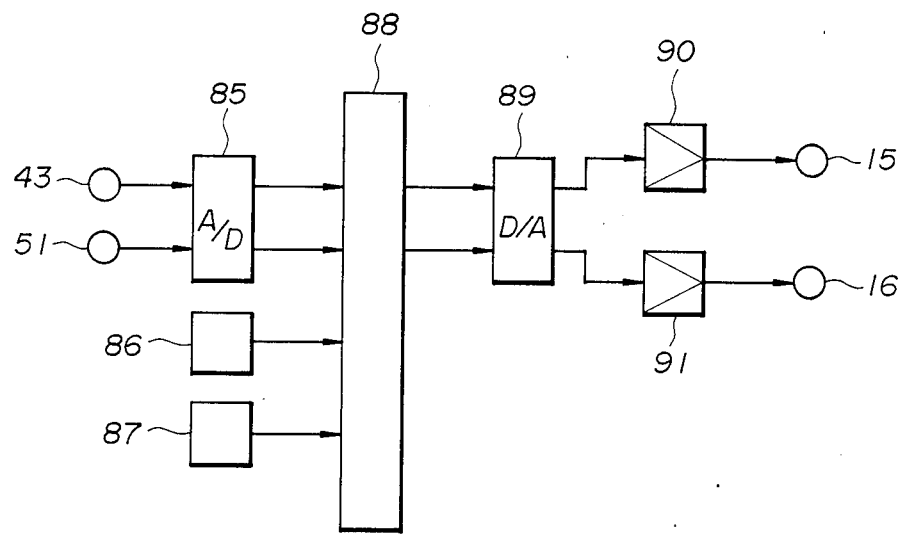
FIG. 17 is a block diagram of a servo motor control system.

FIG. 17 is a control system block diagram of the servo motor 15 for charging and the servo motor 16 for injection. In the diagram, 43 is a charge pressure sensor, 51 is an injection reaction force sensor, 85 is an A/D converter, 86 is a charge setter, 87 is a dwell setter, and 88 is a controller part body which incorporates on I/O port, a μ-c p u, an RAM, an ROM, etc. which are not shown. Further, 89 is a D/A converter, 90 and 91 are servo amplifiers, 15 is a servo motor for charging, and 16 is a servo motor for injection.

As noted above, a detecting signal from the charge pressure sensor 43, located in a manner that it faces on the accumulator chamber of the cylinder member 37, is input to a controller part body 88 through the A/D converter 85. A charge pressure (resin pressure), which is desirable in the accumulator chamber, is input to the RAM of the controller part body 88 through the charge pressure setter 86. Thus, the resin pressure and the set charge pressure, which are actually measured by the charge pressure sensor 43, are compared with each other by the c p u, and if there is a deviation between the set charge pressure and the actually measured resin pressure, a control signal, which is computed so that the measured value is adjusted to the set charge pressure, is input from the controller part body 88 to the servo motor 15 through the D/A converter 89 and the servo amplifier 90. In the servo motor 15, a rotation speed is regulated by means of the input control signal, and this causes control of the charge pressure in the accumulator chamber. As noted above, feedback control by the use of the charge pressure sensor 43 enables charge density of the molten resin 82 to be always maintained at a specified value.

As shown in FIG. 3 and FIG. 8, the injection reaction force sensor 51 is located halfway along the injection bar 50, and dwell control is effected by the aid of the sensor.

Figure 18:
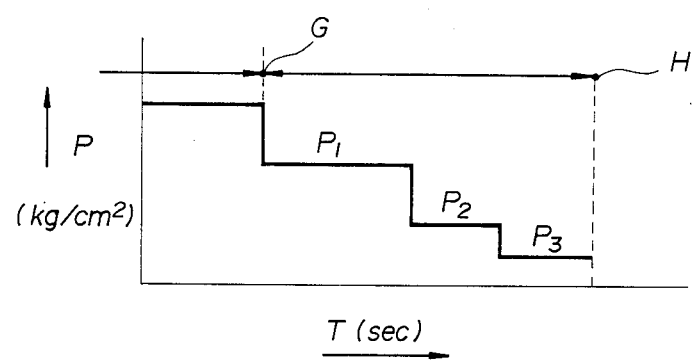
FIG. 18 is a dwell pattern diagram.

Referring now to dwell control, a system, in which in order to improve the size and surface precision of the molded product and prevent the occurrence of molding strain and crack, the injection speed of the molten resin and dwell are changed in plural stages manner for injection molding, is employed. FIG. 18 is a diagram illustrating one example of a dwell pattern.

In this diagram, a lateral bar shows a time (T), a longitudinal bar shows a pressure (P), a point G in the diagram is a dwell switching point of time, a point H is a dwell completing point of time, a pattern between the point G and the point H is a dwell process. In the case of this example, a pressure during a dwell process is set so that the pressure is divided into 3 stages of a first dwell $P_1$, a second dwell $P_2$, and a third dwell $P_3$ and is gradually reduced in order named as a time elapses. Such dwell pattern is properly set according to the shape, the size, size precision, surface precision of a molded product, and the molding conditions of a molding material used.

Such a dwell pattern is set by the dwell setter 87 illustrated in FIG. 17, and is stored in the RAM of the controller part body 88. During a dwell process, a pressure is exerted on resin in the cavity through the plunger 44 by means of the injection bar 50, and a current pressurizing force, or the transfer reaction force of the plunger 44 produced by the resin is electrically detected by an injection reaction force sensor 51 located halfway along the injection bar 50.

Such detecting signal is input, as shown in FIG. 17, the controller part body 88 through the A/D converter 85, and is hourly compared with the dwell set in a manner described above (the first dwell $P_1$, the second dwell $P_2$, and the third dwell $P_3$). If there is a deviation between the set dwell and an actually measured dwell, a control signal, which is computed so that the actually measured dwell is ajusted to the set dwell, is input from the controller part body 88 to the servo motor 16 through the D/A converter 89 and the servo amplifier 91. In the servo motor 16, a feed current, i.e., an output torque is adjusted by means of the input control signal, and this causes the dwell, produced by the plunger 44, to be increased or decreased to the set dwell.

As seen from such embodiment, so-called center plunger system structure, in which the injection bars 50 are respectively coupled to the opposite ends of the holder arm 49 supporting the plunger 44, performs more smooth reciprocation of the plunger 44 and has higher motion reliability compared with a cantilever type. The use of the two injection bars 50 enables an injection reaction force, transferred from the plunger 44 to the single injection bar 50, to be reduced to half, and thereby an inexpensive load cell 51 having low pressure-sensitive capacity suffices for the injection reaction force sensor 51 attached to either of the two injection bars 50.

Data from the charge pressure sensor 43 and the injection reaction force sensor 51 are read in by means of a sampling signal periodically output from the controller part body 88.

Figure 19:
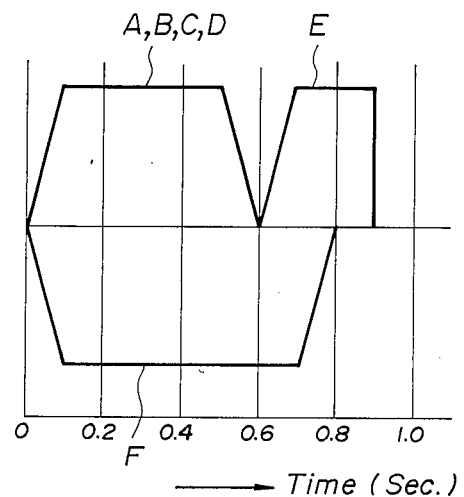
FIG. 19 is an explanatory diagram indicating an actual cycle of a total injection molding process.

FIG. 19 is an explanatory diagram of an actual cycle of the total injection molding process of an injection molder according to the present invention. In the diagram, A is a mold-opening process, B is the trusting process of an eject member, C is the return process of the eject member, and D is a mold-closing process, an the A–D processes are continuously carried out in order named. In the diagram, E is an injection process, and F is a charging process. As illustrated in the diagram, the charging process F is started about simultaneously with the mold-opening process A. Thereby, injection can take place immediately subsequently to the mold-closing process D, and the charging process F and the injection process E are partially concurrently practicable. This enables the actual cycle of the total injection molding process to be reduced to half of the conventional one, resulting in the possibility to shorten the cycle.

Figure 20:
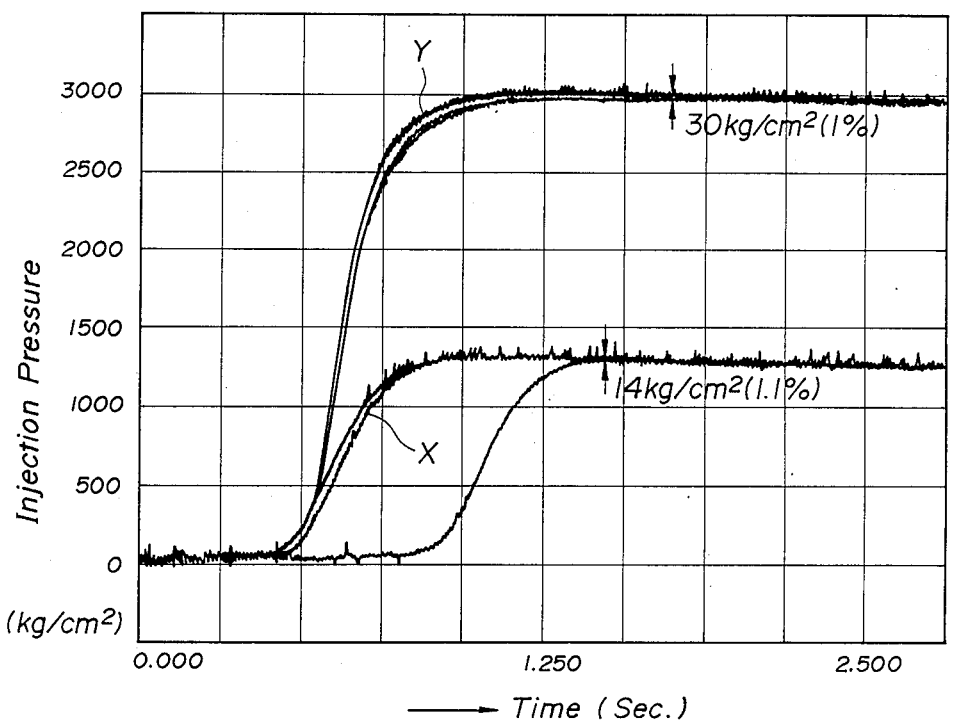
FIG. 20 and FIG. 21 are an injection force properties diagram of an injection molder according to the present invention.
Figure 21:
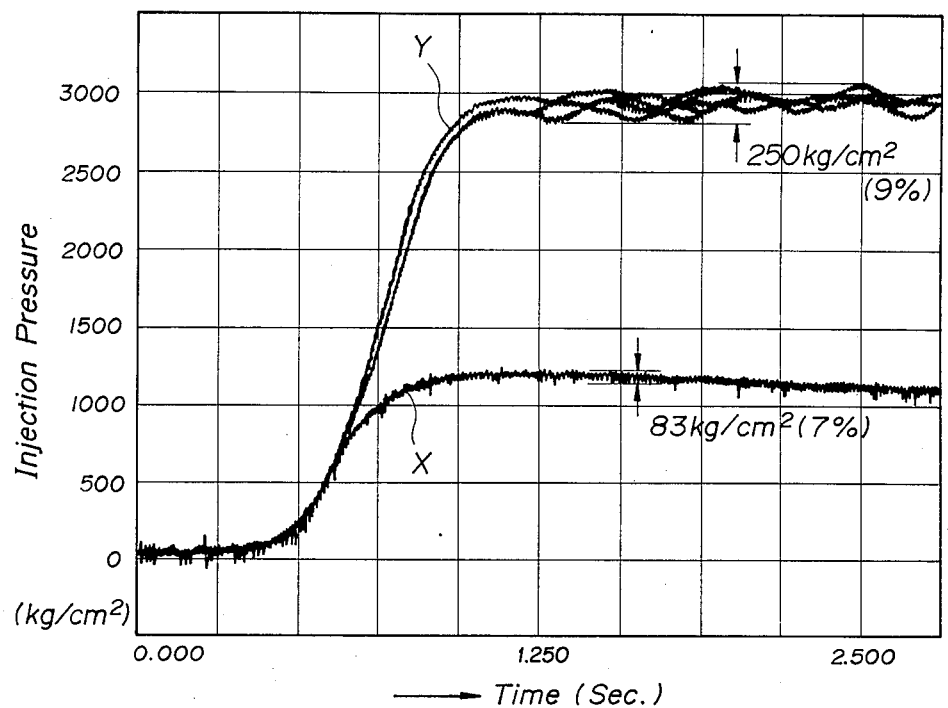
Figure 22:
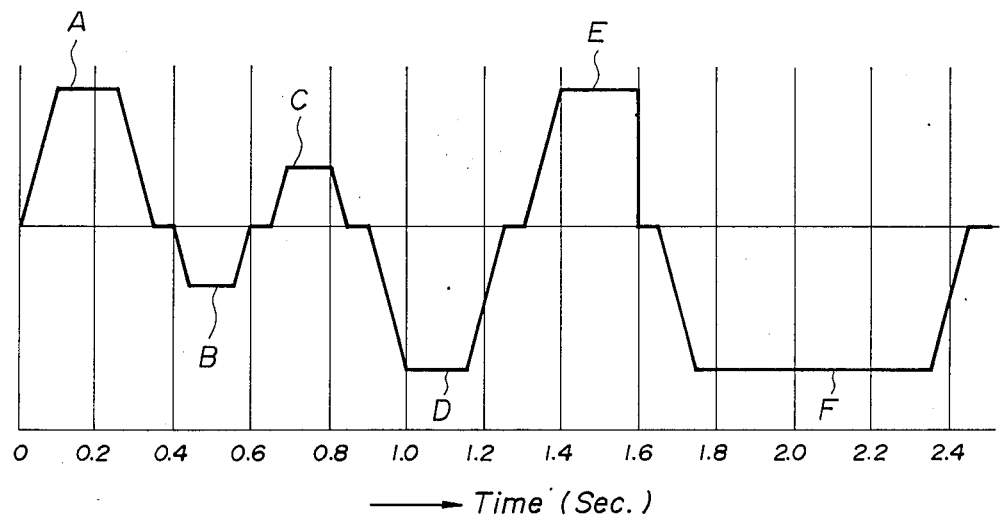
FIG. 22 is an explanatory diagram indicating an actual cycle of the whole injection molding process pertaining to a conventional injection molder.

FIG. 20 and FIG. 21 are an injection properties diagram of a molder according to the present invention and a conventional molder. In the diagram, a curved line X is an actual measurement curved line when an injection force is set to 1200 kg/cm$^2$, and a curved line Y is an actual measurement curved line in case the injection force is set to 2900 kg/cm$^2$. Every test is made in a way that measurement is repeated 10 times, and the uneven state of the injection force is indicated.

In a conventional injection molder, as shown in FIG. 21 a difference in unevenness between actual measurement values obtained when the injection force is set to 1200 kg/cm$^2$ is about 83 kg/cm$^2$, and the degree of unevenness is about 7%. And a difference in unevenness between actual measurement values obtained when the injection force is set to 2900 kg/cm$^2$ is about 250 kg/cm$^2$, and the degree of unevenness is about 9%. With an increase in the injection force, a difference in unevenness is increased.

Conversely, in the injection molder according to the present invetnion, since feedback control of a pressure is effected in a manner described above, a difference in unevenness between actual measurement values obtained when the injection force is set to 1200 kg/cm$^2$ is only about 14 kg/cm$^2$ and the degree of unevenness is about 1.1% as shown in FIG. 20. A difference in unevenness between actual measurement values obtained when the injection force is set to 2900 kg/cm$^2$ is merely about 30 kg/cm$^2$ and the degree of unevenness is about 1%. The injection molder according to the present invention proves, as will be apparant from the aforesaid results, to have less unevenness and high reliability even if an injection force is increased.

As noted above, the injection molder according to the present invention comprises a resin feeding means, such as screw, which feeds molten resin to a portion in the vicinity of the forward end of the heating cylinder and a piston means, such as plunger, having a stop valve mechanism, which is closed when it is moved in an injection direction and opened when it is moved in a counterinjection direction, and injecting the molten resin, fed to a portion in the vicinity of the forward end of the heating cylinder, into the cavity.

The molder is constituted such that through driving of the resin feeding means and piston means, charging of the molten resin to the forward end of the heating cylinder is effected partially concurrently with injection of the molten resin into the cavity.

This constitution permits sharp reduction of the actual cycle of the injection molder and enables to perform high-speed molding.

What is claimed is:

1. An injection molder comprising:
a heating cylinder having forward and rearward ends and including
an injection hole in said forward end,
a slide chamber in a middle part of said heating cylinder,
an accumulation chamber for molten resin surrounding said slide chamber,
a piston means having a stop valve means and
a reciprocating plunger attached to said piston means, said reciprocating plunger moving within said slide chamber, said stop valve means being closed when said reciprocating plunger is moved toward said forward end of said heating cylinder such that said reciprocating plunger causes injection of molten resin into an injection cavity, said stop valve means being opened when said reciprocating plunger is moved toward said rearward end of said heating cylinder charging the molten resin in said accumulation chamber into said injection hole through said stop valve means;
an injection nozzle disposed on said forward end of said heating cylinder in front of said injection hole; and
a screw disposed on said rearward end of said heating cylinder, said screw continuously revolving at a stationary position without reciprocating, said screw revolving in one direction for continuously feeding molten resin into said accumulation chamber to the forward end of said heating cylinder.

2. An injection molder as claimed in claim 1, further comprising a charge pressure sensor for detecting the pressure of molten resin, said change pressure sensor is attached to a portion of the forward end of said heating cylinder, a charge pressure setter for setting a desired molten resin pressure, and said resin feed means includes said screw rotating in one-way and having an adjustable rotation speed, wherein the rotation speed of the screw is adjuatable, based on the result of comparison of a detecting signal from said charge pressure sensor with a set signal set by the charge pressure setter.

3. Injection molder as claimed in claim 2, wherein a driving source of said screw is a servo motor.

4. Injection molder as claimed in claim 1, wherein said plunger which is reciprocated in a rear of said injection nozzle has an adjustable stroke distance.

5. Injection molder as claimed in claim 1, further comprising an injection reaction force sensor located to a part of a driving force transfer mechanism which transfers a rotation force of a forward and reverse runnable driving motor to said plunger, and a dwell setting means which is capable of setting a dwell of resin with which a cavity is filled is attached, whereby an output torque of said driving motor is capable of being regulated, based on a result of comparison of a detecting signal from said injection reaction force sensor with a set signal set by a dwell setting means.

6. Injection molder as claimed in claim 5, wherein said driving motor is a servo motor.

7. Injection molder claimed in claim 1, further comprising a holder arm supporting the plunger and reciprocating together with the plunger, a orifice formed between said resin feed means and the holder arm, and a needle which is capable reciprocating by means of a pressure of molten resin fed through the orifice with the aid of a resin feed means and reciprocating of said holder arm is disposed between the orifice and the holder arm.

8. Injection molder claimed in claim 1, wherein a resin feed means driving motor for driving said resin feed means and a piston means driving motor for driving said piston means are independently disposed, a charge pressure sensor for detecting a pressure of molten resin is located in a vicinity of said heating cylinder, and an injection reaction force sensor is attached to a part of a driving force transfer mechanism of said piston means, wherein based on a detecting signal from said charge pressure sensor, a number of revolutions of said driving motor for resin feed means is controlled, and in response to a detecting signal from said injection force sensor, an output torque during dwell of said driving motor for piston means is controlled.

9. An injection molder according to claim 1, further comprising a moving body for being introduced into said accumulation chamber, said moving body being disposed behind said piston means so as to reduce a volume of said accumulation chamber by introducing said moving body into said accumulation chamber which immediately extrudes the molten resin stored in said accumulation chamber into said injection hole.

10. An injection molder according to claim 9, wherein said moving body is a needle and is aligned on an axis with said screw.

* * * * *